(12) United States Patent
Kim et al.

(10) Patent No.: US 10,153,879 B2
(45) Date of Patent: Dec. 11, 2018

(54) METHOD OF PROCESSING REFERENCE SIGNAL IN WIRELESS COMMUNICATION SYSTEM AND APPARATUS THEREFOR

(71) Applicant: LG ELECTRONICS INC., Seoul (KR)

(72) Inventors: Hyungtae Kim, Seoul (KR); Kijun Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 83 days.

(21) Appl. No.: 15/341,464

(22) Filed: Nov. 2, 2016

(65) Prior Publication Data

US 2017/0126380 A1    May 4, 2017

Related U.S. Application Data

(60) Provisional application No. 62/250,443, filed on Nov. 3, 2015, provisional application No. 62/257,670, filed on Nov. 19, 2015.

(51) Int. Cl.
*H04L 5/00*    (2006.01)
*H04W 72/04*   (2009.01)
*H04B 7/06*    (2006.01)

(52) U.S. Cl.
CPC ......... *H04L 5/0048* (2013.01); *H04B 7/0619* (2013.01); *H04L 5/0025* (2013.01); *H04L 5/0057* (2013.01); *H04W 72/04* (2013.01)

(58) Field of Classification Search
CPC ... H04B 7/0619; H04L 5/0025; H04L 5/0048; H04L 5/0057; H04W 72/04
See application file for complete search history.

(56) References Cited

U.S. PATENT DOCUMENTS

| | | | |
|---|---|---|---|
| 2012/0134338 A1* | 5/2012 | Ko | H04L 5/0048 370/330 |
| 2012/0155561 A1* | 6/2012 | Seo | H04B 7/15542 375/260 |
| 2012/0230290 A1* | 9/2012 | Seo | H04L 1/0026 370/329 |
| 2014/0241273 A1* | 8/2014 | Kim | H04J 11/005 370/329 |

* cited by examiner

*Primary Examiner* — Kashif Siddiqui
(74) *Attorney, Agent, or Firm* — Birch, Stewart, Kolasch & Birch, LLP

(57) ABSTRACT

The present specification proposes a method of reporting channel quality information (CQI) by a user equipment (UE) to a base station (BS) in a wireless communication system. Specifically, the method includes the step of receiving a cell specific reference signal from the BS; calculating the CQI using the cell specific reference signal on the assumption that a specific number of resource elements (REs) for a demodulation-reference signal (DM-RS) exists; and reporting the CQI to the BS. Especially, if a most recent reported rank is 3 or 4, the specific number of REs for the DM-RS is assumed as a specific value, which is different from a minimum number of REs for the DM-RS or a maximum number of REs for the DM-RS.

16 Claims, 10 Drawing Sheets

FIG. 2
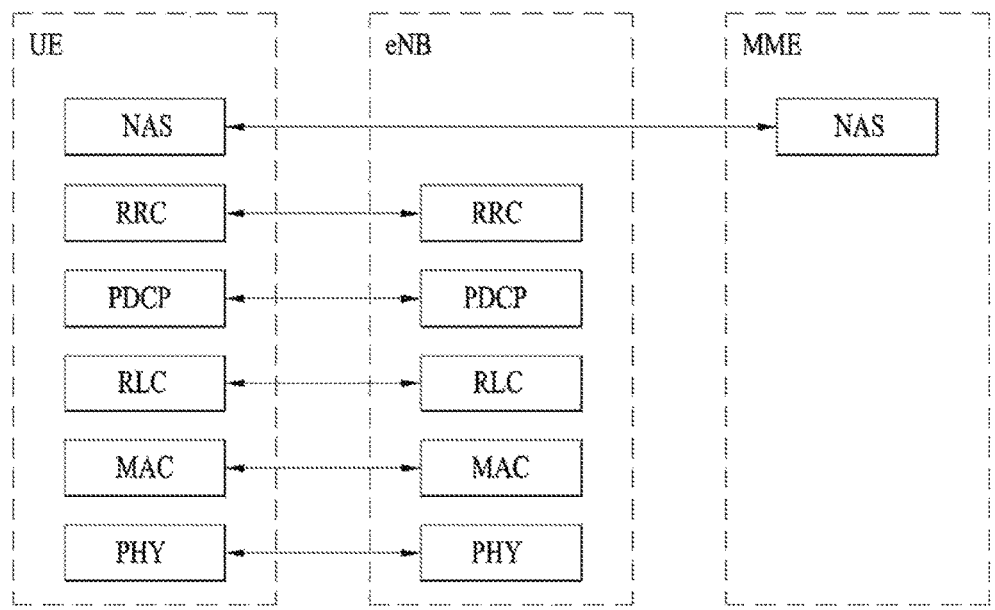
(A) CONTROL-PLANE PROTOCOL STACK
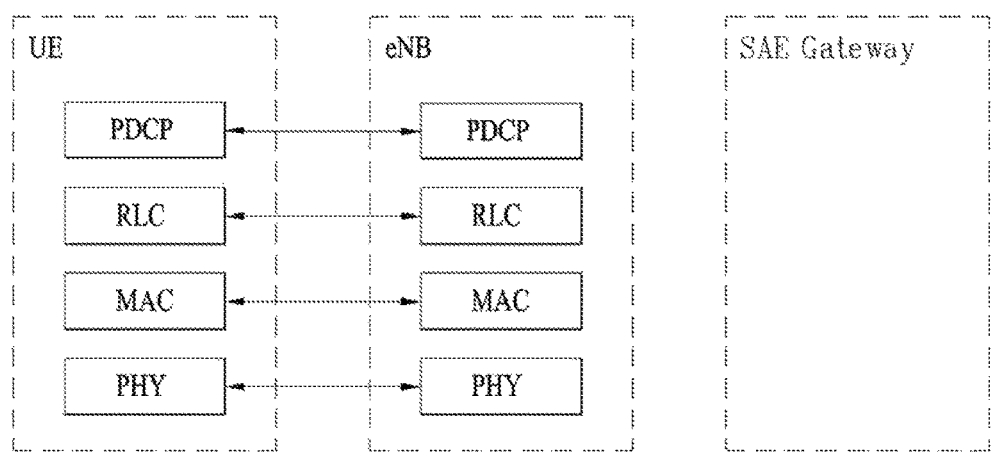
(B) USER-PLANE PROTOCOL STACK

METHOD OF PROCESSING REFERENCE SIGNAL IN WIRELESS COMMUNICATION SYSTEM AND APPARATUS THEREFOR

This application claims the benefits of the U.S. Provisional Patent Application No. 62/250,443, filed on Nov. 3, 2015 and the U.S. Provisional Patent Application No. 62/257,670, filed on Nov. 19, 2015 which are hereby incorporated by references as if fully set forth herein.

BACKGROUND OF THE INVENTION

Field of the Invention

The present invention relates to a wireless communication system, and more particularly, to a method of processing a reference signal in a wireless communication system and an apparatus therefor.

Discussion of the Related Art

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARD) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

SUMMARY OF THE INVENTION

Accordingly, the present invention is directed to an apparatus and method thereof that substantially obviate one or more problems due to limitations and disadvantages of the related art.

An object of the present invention is to provide a method of processing a reference signal in a wireless communication system and an apparatus therefor in the following based on the aforementioned discussion.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of reporting channel quality information (CQI) by a user equipment (UE) to a base station (BS) in a wireless communication system, includes the steps of receiving a cell specific reference signal from the BS; calculating the CQI using the cell specific reference signal on the assumption that a specific number of resource elements (REs) for a demodulation-reference signal (DM-RS) exists; and reporting the CQI to the BS.

To further achieve these objects and other advantages and in accordance with the purpose of the invention, as embodied and broadly described herein, according to a different embodiment, a user equipment (UE) in a wireless communication system includes a radio frequency (RF) unit and a processor configured to receive a cell specific reference signal from a base station (BS), calculate channel quality information (CQI) using the cell specific reference signal on the assumption that a specific number of resource elements (REs) for a demodulation-reference signal (DM-RS) exists, and report the CQI to the BS.

Preferably, if a most recent reported rank is less than 3, the specific number of REs for the DM-RS is assumed as a minimum number of REs for the DM-RS. Further, if the most recent reported rank is more than 4, the specific number of REs for the DM-RS is assumed as a maximum number of REs for the DM-RS. However, if the most recent reported rank is 3 or 4, the specific number of REs for the DM-RS is assumed as a specific value, which is different from the minimum number or the maximum number.

In this case, information on the specific value may be received from the BS. Or, the specific value may be transmitted with the CQI to the BS. Or, the specific value is determined as (the minimum number+the maximum number)/2.

More preferably, a rank is 3 or 4, antenna ports of the DM-RS are mapped to same resource elements by a code divisional multiplexing (CDM) scheme or to different resource elements by the CDM scheme and a frequency divisional multiplexing (FDM) scheme. Here, when the antenna ports of the DM-RS are mapped to the same resource elements and the rank is 3, indexes of the antenna ports of the DM-RS are 7, 8 and 11. However, when the antenna ports of the DM-RS are mapped to the different resource elements and the rank is 3, indexes of the antenna ports of the DM-RS are 7, 8 and 9.

Similarly, when the antenna ports of the DM-RS are mapped to the same resource elements and the rank is 4, indexes of the antenna ports of the DM-RS are 7, 8, 11 and 13. But, when the antenna ports of the DM-RS are mapped to the different resource elements and the rank is 4, indexes of the antenna ports of the DM-RS are 7, 8, 9 and 10.

More preferably, the downlink data channel is received from the BS. In this case, if a rank of the downlink data channel is less than 3, it is assumed that a transmission power of the DM-RS is same as a transmission power of THE downlink data channel. Further, if the rank of the downlink data channel is more than 4, it is assumed that the transmission power of the DM-RS is greater than the transmission power of the downlink data channel by 3 dB. However, if the rank of the downlink data channel is 3 or 4, it is assumed that the transmission power of the DM-RS is greater than the transmission power of the downlink data channel by a first value or a second value, respectively.

Here, information on the first and second values is received from the BS.

According to embodiments of the present invention, it is able to efficiently receive a reference signal by a user equipment in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram illustrating structures of a control plane and a user plane of a radio interface protocol between a UE and an evolved UMTS terrestrial radio access network (E-UTRAN) based on the 3GPP radio access network specification;

DETAILED DESCRIPTION OF THE INVENTION

Figure 1:
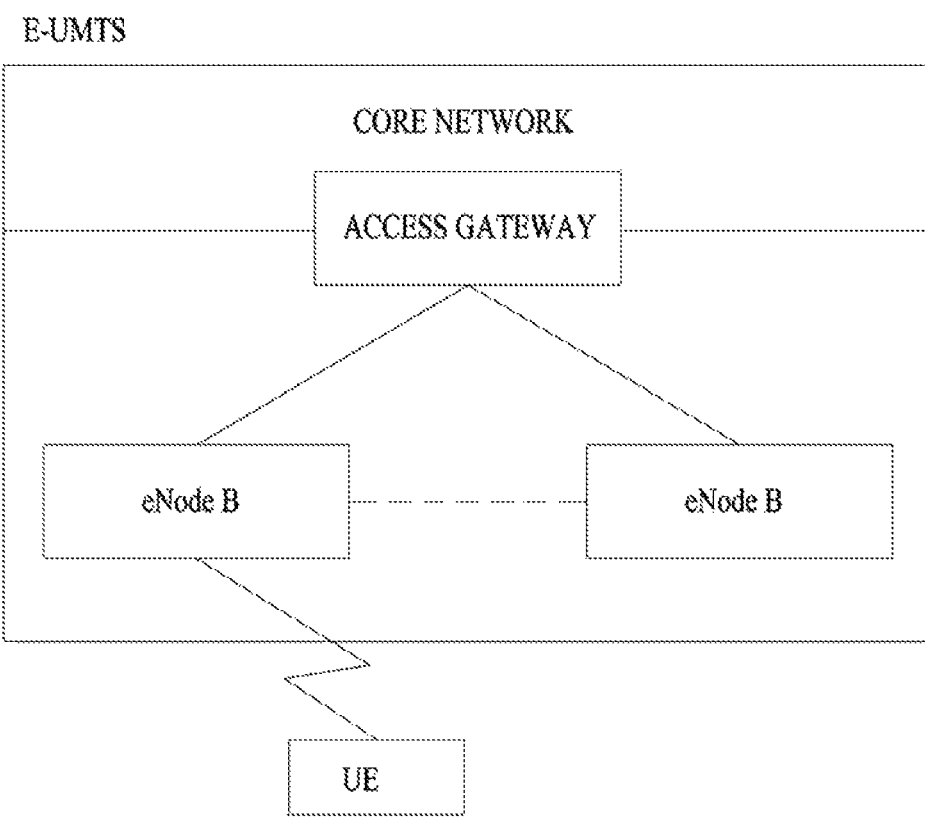
FIG. 1 is a diagram schematically illustrating a network structure of an evolved universal mobile telecommunications system (E-UMTS) as an exemplary radio communication system.

Reference will now be made in detail to the preferred embodiments of the present invention, examples of which are illustrated in the accompanying drawings. Wherever possible, the same reference numbers will be used throughout the drawings to refer to the same or like parts.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
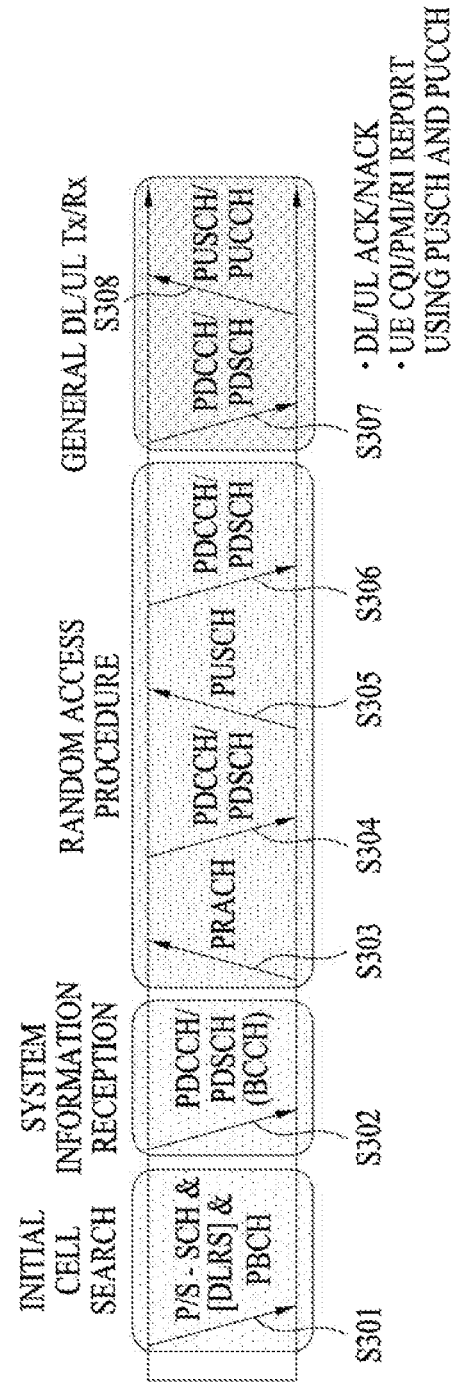
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
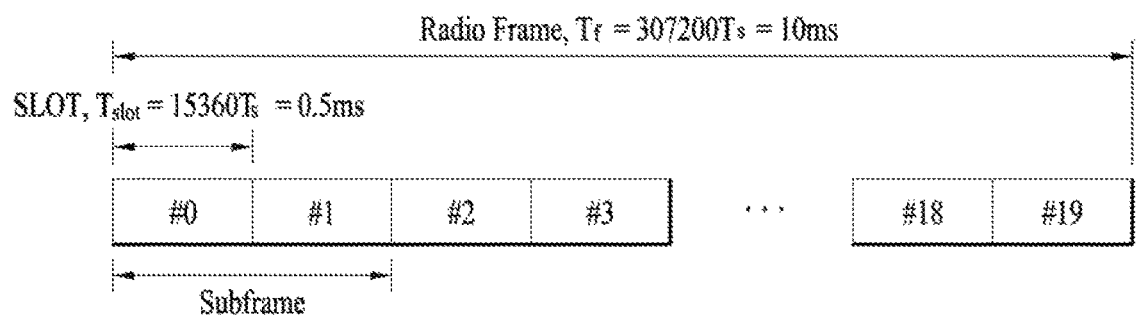
FIG. 4 is a diagram illustrating the structure of a radio frame used in a long term evolution (LTE) system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×10-8 (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
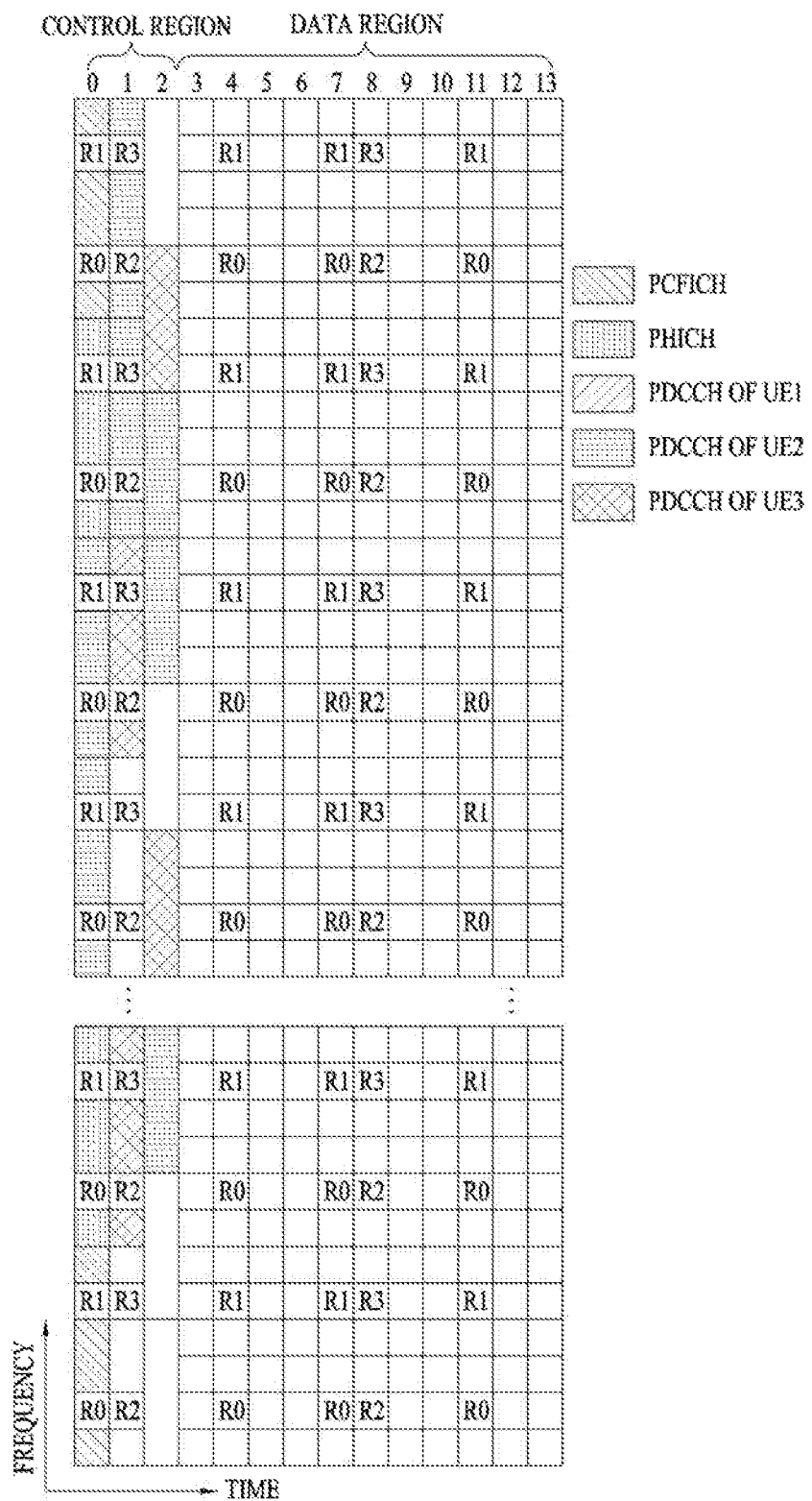
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
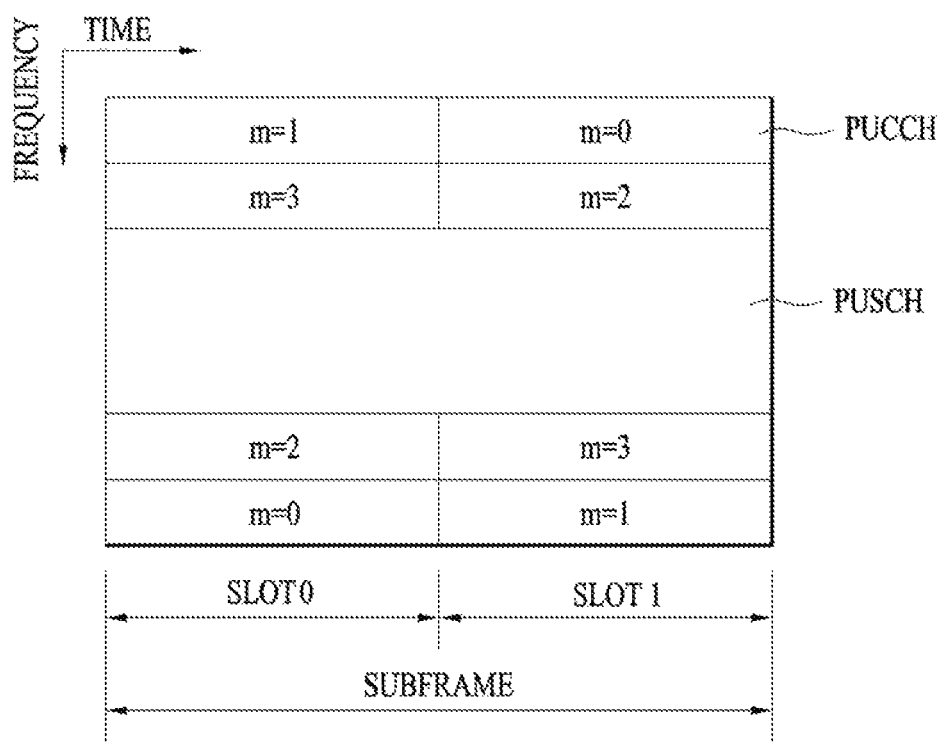
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Now a detailed description will be given of RS.

In general, a transmitter transmits an RS known to both the transmitter and a receiver along with data to the receiver so that the receiver may perform channel measurement in the RS. The RS indicates a modulation scheme for demodulation as well as the RS is used for channel measurement. The RS is classified into Dedicated RS (DRS) for a specific UE (i.e. UE-specific RS) and Common RS (CRS) for all UEs within a cell (i.e. cell-specific RS). The cell-specific RS includes an RS in which a UE measures a CQI/PMI/RI to be reported to an eNB. This RS is referred to as Channel State Information-RS (CSI-RS).

Figure 7:
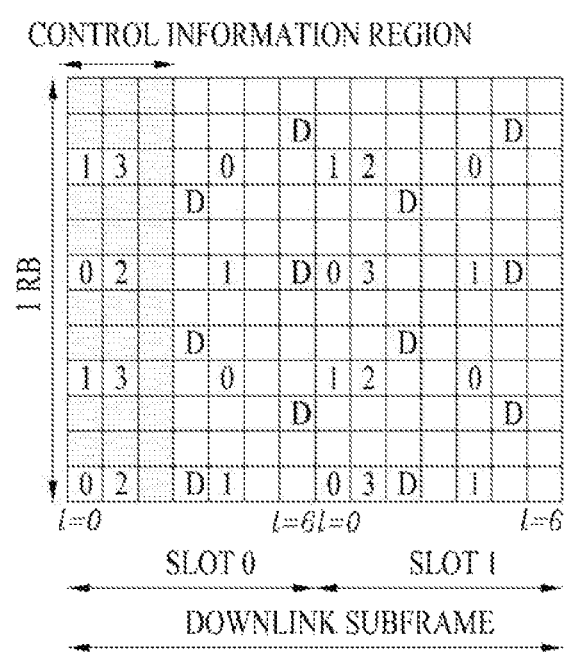
FIGS. 7 and 8 illustrate downlink Reference Signal (RS) configurations in an LTE system supporting downlink transmission through four antennas (4-Tx downlink transmission)
Figure 8:
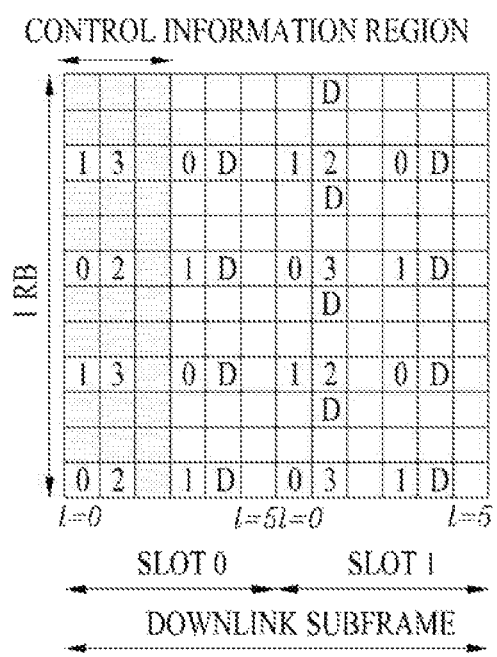

FIGS. 7 and 8 illustrate RS configurations in an LTE system supporting DL transmission through four antennas (4-Tx DL transmission). Specifically, FIG. 8 illustrates an RS configuration in the case of a normal CP and FIG. 9 illustrates an RS configuration in the case of an extended CP.

Referring to FIGS. 7 and 8, reference numerals 0 to 3 in grids denote cell-specific RSs, CRSs transmitted through antenna port 0 to antenna port 3, for channel measurement and data modulation. The CRSs may be transmitted to UEs across a control information region as well as a data information region.

Reference character D in grids denotes UE-specific RSs, Demodulation RSs (DM-RSs). The DM-RSs are transmitted in a data region, that is, on a PDSCH, supporting single-antenna port transmission. The existence or absence of a UE-specific RS, DM-RS is indicated to a UE by higher-layer signaling. In FIGS. 7 and 8, the DM-RSs are transmitted through antenna port 5. 3GPP TS 36.211 defines DM-RSs for a total of eight antenna ports, antenna port 7 to antenna port 14.

Figure 9:
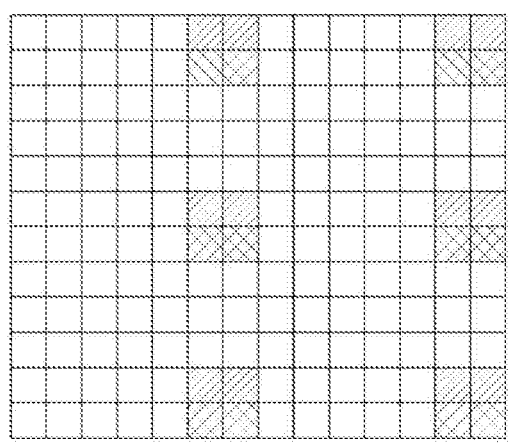
FIG. 9 illustrates an exemplary downlink Demodulation Reference Signal (DM-RS) allocation defined in a current 3GPP standard specification.

FIG. 9 illustrates an example of allocating a downlink DM-RS defined in a current 3GPP LTE system. In particular, FIG. 9 illustrates REs occupied by a DM-RS among REs in one RB pair of a normal downlink subframe having a normal CP.

A DM-RS is supported for transmission of a PDSCH, and corresponds to an antenna port p=5, p=7, p=8 or p=7, 8, . . . , υ+6 (here, υ denotes the number of layers used for transmission of the PDSCH). The DM-RS is present when transmission of the PDSCH is related with a corresponding antenna port, and is a valid reference only for demodulation of the PDSCH. The DM-RS is transmitted only on RBs to which the PDSCH is mapped.

In other words, the DM-RS is configured to be transmitted only on the RBs to which the PDSCH is mapped in a subframe in which the PDSCH is scheduled unlike a CRS which is configured to be transmitted in every subframe irrespective of the presence/absence of the PDSCH. In addition, the DM-RS is transmitted only through antenna port(s) corresponding to respective layer(s) of the PDSCH unlike the CRS which is transmitted through all antenna port(s) irrespective of the number of layers of the PDSCH. Therefore, overhead of the RS may be reduced when compared to the CRS.

In the 3GPP LTE-A system, the DM-RS is defined in a PRB pair. Referring to FIG. 9, for p=7, p=8 or p=7, 8, . . . , υ+6, a DM-RS sequence r(m) is mapped to complex modulation symbols $a_{k,l}^{(p)}$ according to Equation 1 below in a PRB having a frequency-domain index $n_{PRB}$ assigned for transmission of the PDSCH.

$$a_{k,l}^{(p)} = w_p(l') \cdot r(3 \cdot l' \cdot N_{RB}^{max,DL} + 3 \cdot n_{PRB} + m') \quad \text{[Equation 1]}$$

Here, $w_p(i)$, l', and m' are given by the following Equation 2.

$$w_p(i) = \begin{cases} \bar{w}_p(i) & (m' + n_{PRB}) \bmod 2 = 0 \\ \bar{w}_p(3-i) & (m' + n_{PRB}) \bmod 2 = 1 \end{cases} \quad \text{[Equation 2]}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, or 8} \\ l' \bmod 2 + 2 + 3\lfloor l'/2 \rfloor & \text{if in a special subframe with configuration 1, 2, 6, or 7} \\ l' \bmod 2 + 5 & \text{if not in a special subframe} \end{cases}$$

-continued $$l' = \begin{cases} 0, 1, 2, 3 & \text{if } n_s \bmod 2 = 0 \text{ and in a special} \\ & \text{subframe with configuration 1, 2, 6, or 7} \\ 0, 1 & \text{if } n_s \bmod 2 = 0 \text{ and not in special} \\ & \text{subframe with configuration 1, 2, 6, or 7} \\ 2, 3 & \text{if } n_s \bmod 2 = 1 \text{ and not in special} \\ & \text{subframe with configuration 1, 2, 6, or 7} \end{cases}$$

$$m' = 0, 1, 2$$

Here, a sequence $\overline{w}_p(i)$ having a length of 4 for the normal CP, that is, an orthogonal cover code (OCC) is given as Table 1 below according to an antenna port index.

TABLE 1

| Antenna port p | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

In addition, for an antenna port $p \in \{7, 8, \ldots, \upsilon+6\}$, the DM-RS sequence r(m) is defined as the following Equation 3.

$$r(m) = \frac{1}{\sqrt{2}}(1 - 2 \cdot c(2m)) + j\frac{1}{\sqrt{2}}(1 - 2 \cdot c(2m+1)), \quad [\text{Equation 3}]$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

In Equation 3, c(i) is a pseudo-random sequence, and is defined by a length-31 Gold sequence. An output sequence c(n) having a length of $M_{PN}$ (here, n=0, 1, …, $M_{PN}$−1) is defined by the following Equation 4.

$$c(n) = 1(n+N_C) + x_2(n+N_C)) \bmod 2$$

$$x_1(n+31) = x_1(n+3) + x_1(n)) \bmod 2$$

$$x_2(n+31) = (x_2(n+3) + x_2(n+2) + x_2(n+1) + x_2(n)) \bmod 2 \quad [\text{Equation 4}]$$

In the above Equation 4, $N_C=1600$, a first m-sequence is initialized to $x_1(0)=1$, $x_1(n)=0$, n=1, 2, …, 30, and a second m-sequence is denoted by $c_{init}=\Sigma_{i=0}^{30} x_2(i) \cdot 2^i$ which has a value according to application of the above sequence. In Equation 4, a pseudo-random sequence for generation of c(i) is initialized to $c_{init}$ according to Equation 5 below at a start of each subframe.

$$c_{init} = (\lfloor n_s/2 \rfloor + 1) \cdot (2N_{ID}^{cell} + 1) \cdot 2^{16} + n_{SCID} \quad [\text{Equation 5}]$$

In the above Equation 5, $n_{SCID}$ has a value of 0 unless otherwise specified, and is given by a DCI format 2B or 2C related to transmission of the PDSCH for transmission of the PDSCH on antenna port 7 or 8. DCI format 2B is a DCI format for a PDSCH which uses a maximum of two antenna ports having DM-RSs, and DCI format 2C is a DCI format for a PDSCH which uses a maximum of eight antenna ports having DM-RSs.

In the following, a method of calculating CSI defined by a current 3GPP standard document, i.e., CQI, is explained. In general, a UE identifies a channel status using an RS (reference signal), i.e., a CSI-RS, transmitted from an eNB, selects a CQI index corresponding to an MCS (modulation and coding scheme) of which BLER (block error rate) does not exceed 10% from Table 2 in a situation that a prescribed condition defined for CQI calculation is assumed, and reports the selected CQI index to the eNB.

TABLE 2

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

A procedure of calculating CQI is explained in more detail.

First of all, a UE receives a reference signal (for example, CRS or CSI-RS) from an eNB, selects a best PMI for each rank based on a predefined PMI (precoding matrix index) codebook using the reference signal, and calculates SINR (signal to interference plus noise ratio) per layer according to the selected best PMI. And, the UE calculates SINR per codeword based on the SINR per layer and a codeword to layer mapping rule.

Subsequently, spectral efficiency (SE) satisfying BLER (block error rate) 10% is calculated from each of the SINR per codeword and throughput per codeword is calculated using $N_{RE}$ corresponding to the number of resource elements available in PDSCH and the SE.

And, sum of throughput per each rank is calculated based on the throughput per codeword and a biggest throughput and a rank corresponding to the biggest throughput are selected. In particular, an RI is determined. And, values resulted from multiplying the SE by N of PDSCH and the biggest throughput are compared with each other in Table 2 and a closest CQI is reported to the eNB.

Meanwhile, LTE system defines such an assumption on a reference resource for measuring CQI as Table 3 in the following. In particular, the assumption includes an assumption on the $N_{RE}$ of PDSCH necessary for the procedure of calculating the CQI. In this case, it is assumed that the reference resource corresponds to a resource region to which the CQI is applied. The UE receives one or more reference signals from the eNB and measures CQI based on the one or more reference signals. In this case, the UE assumes that PDSCH corresponding to the CQI is transmitted according to following Table 3. Yet, in this case, it is required that the reference resource corresponds to a DL subframe available for measuring CSI.

TABLE 3

The first 3 OFDM symbols are occupied by control signalling
No resource elements used by primary or secondary synchronisation signals or PBCH
CP length of the non-MBSFN subframes
Redundancy Version 0
If CSI-RS is used for channel measurements, the ratio of PDSCH EPRE to CSI-RS EPRE is as given by higher layer signaling
Assume no REs allocated for CSI-RS and zero-power CSI-RS
Assume no REs allocated for PRS
The PDSCH transmission scheme depending on the transmission mode currently configured for the UE (which may be the default mode).
If CRS is used for channel measurements, the ratio of PDSCH EPRE to cell-specific RS EPRE is as given by higher layer signaling with the exception of $\rho_A$ which shall be assumed to be
    $\rho_A = P_A + \Delta_{offset} + 10\log_{10}(2)$ [dB] for any modulation scheme, if the UE is configured with transmission mode 2 with 4 cell-specific antenna ports, or transmission mode 3 with 4 cell-specific antenna ports and the associated RI is equal to one;
    $\rho_A = P_A + \Delta_{offset}$ [dB] for any modulation scheme and any number of layers, otherwise.
The shift $\Delta_{offset}$ is given by the parameter nomPDSCH-RS-EPRE-Offset which is configured by higher-layer signalling.

For example, a first assumption of Table 3 is to assume that PDSCH is not transmitted to first 3 OFDM symbols in a single subframe when CQI is calculated. Since PDCCH may vary according to a subframe, this means that a UE, which is unable to know the number of PDCCH symbols of a subframe to which the CQI is applied, calculates the CQI by assuming the maximum number of symbols in which PDCCH is transmittable.

Having received the calculated CQI, the eNB adds a separate compensation value to the CQI to make the CQI to be appropriate for a configuration (e.g., number of PDCCH symbols of a subframe to which the CQI is applied) actually applied to DL transmission corresponding to the CQI and may be then able to determine a DL transport block size and the like.

Especially, for transmission mode 10 (i.e., CoMP mode) CSI reporting, if a CSI process is configured with PMI/RI reporting, the UE further assumes that PDSCH corresponding to the CQI is transmitted according to following Table 4.

TABLE 4

CRS REs are as in non-MBSFN subframes. The CRS overhead is assumed to be the same as the CRS overhead corresponding to the number of CRS antenna ports of the serving cell;
The UE-specific reference signal overhead is consistent with the most recent reported rank for the CSI process if more than one CSI-RS port is configured, and is consistent with rank 1 transmission if only one CSI-RS port is configured; and PDSCH signals on antenna ports $\{7 \ldots 6 + \upsilon\}$ for $\upsilon$ layers would result in signals equivalent to corresponding symbols transmitted on antenna ports $\{15 \ldots 14 + P\}$, as given by $$\begin{bmatrix} y^{(15)}(i) \\ \vdots \\ y^{(14+P)}(i) \end{bmatrix} = W(i) \begin{bmatrix} x^{(0)}(i) \\ \vdots \\ x^{(\upsilon-1)}(i) \end{bmatrix},$$

where $x(i) = [x^{(0)}(i) \ldots x^{(\upsilon-1)}(i)]^T$ is a vector of symbols from the layer mapping in subclause 6.3.3.2 of [3], $P \in \{1,2,4,8,12,16\}$ is the number of antenna ports of the associated CSI-RS resource, and if P = 1, W(i) is 1, otherwise for UE configured for PMI/RI reporting W(i) is the precoding matrix corresponding to the reported PMI applicable to x(i) and for UE configured without PMI reporting W(i) is the selected precoding matrix corresponding to the reported CQI applicable to x(i). The corresponding PDSCH signals transmitted on antenna ports $\{15 \ldots 14 + P\}$ would have a ratio of EPRE to CSI-RS EPRE equal to the ratio given in subclause 7.2.5

Meanwhile, according to the LTE standard document of Table 5 below, since orthogonality of DM-RS ports is ensured through FDM in transmission of rank 3 or more from the viewpoint of SU-MIMO, 24 REs may be assumed as DM-RS overhead per PRB pair. That is, 24 REs are assumed as DM-RS RE overhead if the most recently reported rank is equal to or greater than 3 and, otherwise, 12 REs are assumed as DM-RS RE overhead.

TABLE 5

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Recently, in the FD-MIMO field, improvement of a DM-RS has been discussed. In particular, in an FD-MIMO system, a method of improving DM-RSs of rank 3 (i.e., 3-layer transmission) and rank 4 (i.e., 4-layer transmission) for SU-MIMO transmission to use DM-RS ports 7, 8, 11 and 13 in addition to DM-RS ports 7, 8, 9 and 10 has been discussed. For example, at rank 3, the eNB may inform the UE whether DM-RS ports 7, 8 and 9 or DM-RS ports 7, 8 and 11 are used.

If DM-RS ports 7, 8 and 11 are used at rank 3, since CDM is performed through length-4 OCC without using FDM, DM-RS RE overhead is 12 REs. If DM-RS ports 7, 8, 11 and 13 are used at rank 4, DM-RS RE overhead is 12 REs. Accordingly, if the most recently reported rank is 3 or 4, there is ambiguity in determining whether 12 REs or 24 REs are assumed as DM-RS RE overhead.

In order to solve such a problem, defining a new transmission mode (hereinafter, TM x) or using an existing transmission mode for FD-MIMO and an UE assuming DM-RS RE overhead using one of the following methods 1) to 6) and calculating CQI if separate signaling indicating FD-MIMO transmission is defined are proposed. For example, if specific RRC signaling indicating that a DM-RS configuration of new length-4 OCC for FD-MIMO (different from Table 5 above) should be applied is received, a UE may assume DM-RS RE overhead using one of the following methods 1) to 6) and calculate CQI. Hereinafter, a UE-specific reference signal is referred to as a DM-RS.

1) UE-specific reference signal overhead is determined by the most recent reported rank for the CSI process if more than one CSI-RS port is configured:
    if rank is less than 3, 12 RE per PRB pair
    otherwise, 24 RE per PRB pair 2) UE-specific reference signal overhead is determined by the most recent reported rank for the CSI process if more than one CSI-RS port is configured:
    if rank is less than 5, 12 RE per PRB pair
    otherwise, 24 RE per PRB pair In the case of method 1) or 2), the UE assumes fixed DM-RS RE overhead upon calculating CQI of rank 3 or rank 4. As a result, the UE may explicitly define DM-RS RE overhead assumption upon calculating CQI of rank 3 or rank 4 and the eNB, which has received the CQI, may accurately determine an MCS because which DM-RS RE overhead is assumed by the UE to calculate the CQI is explicit.

3) UE-specific reference signal overhead is determined by the most recent reported rank for the CSI process if more than one CSI-RS port is configured:
  if rank is less than 3, 12 RE per PRB pair
  if rank is more than 4, 24 RE per PRB pair
  otherwise, eNB configures 12 RE or 24 RE as DM-RS overhead to UE 4) UE-specific reference signal overhead is determined by the most recent reported rank for the CSI process if more than one CSI-RS port is configured:
  if rank is less than 3, 12 RE per PRB pair
  if rank is more than 4, 24 RE per PRB pair
  otherwise, UE assumes 12 RE or 24 RE as DM-RS overhead and provides the assumption to eNB.

In particular, in method 3), DM-RS RE overhead information may be provided through RRC signaling or may be dynamically signaled through a PDCCH, etc. In method 4), DM-RS RE overhead information may be reported to the eNB along with the CSI.

5) UE-specific reference signal overhead is determined by the most recent reported rank for the CSI process if more than one CSI-RS port is configured:
  if rank is less than 3, 12 RE per PRB pair
  if rank is 3, UE assumes 16 RE per PRB pair
  otherwise, 24 RE per PRB pair.

6) UE-specific reference signal overhead is determined by the most recent reported rank for the CSI process if more than one CSI-RS port is configured:
  if rank is less than 3, 12 RE per PRB pair
  if rank is 3, UE assumes 16 RE per PRB pair
  if rank is 4, UE assumes 16 RE per PRB pair
  otherwise, 24 RE per PRB pair.

In particular, in method 5), if DM-RS ports 7, 8 and 11 (or 7, 8 and 13) are additionally applicable to layer 3 in addition to DM-RS ports 7, 8 and 9 such that there is ambiguity in determining whether 12 REs or 24 REs are configured as DM-RS RE overhead, CSI is calculated on the assumption of overhead of 16 REs which is an average between 12 REs and 24 REs.

In particular, in method 6), if DM-RS ports 7, 8 11 and 13 are additionally applicable to layer 4 as well as layer 3 in addition to DM-RS ports 7, 8, 9 and 10 such that there is ambiguity in determining whether 12 REs or 24 REs are configured as DM-RS RE overhead, CSI is calculated on the assumption of overhead of 16 REs which is an average between 12 REs and 24 REs.

If method 5) and method 6) are generalized, when there is ambiguity in determining which of x REs and y REs are configured as RE overhead, the UE may calculate the CQI on the assumption of overhead of (x+y)/2 REs which is an average of the x REs and the y REs.

Meanwhile, if DM-RS ports 7, 8, 11 and 13 are used in addition to DM-RS ports 7, 8, 9 and 10 by improving the DM-RSs of rank 3 and rank 4, PDSCH power assumption should also be modified when PDSCHs are demodulated using the DM-RSs.

In particular, in the current LTE standard document, as shown in Table 6 below, PDSCH power is assumed upon PDSCH demodulation.

TABLE 6

For transmission mode 9 or 10, if UE-specific RSs (i.e., DM-RSs) are present in the PRBs upon which the corresponding PDSCH is mapped, the UE may assume the ratio of PDSCH EPRE to UE-specific RS EPRE within each OFDM symbol containing UE-specific RS is 0 dB for number of transmission layers less than or equal to two and −3 dB otherwise.

More specifically, in TM 9 or TM 10, assume that the UE receives PDSCH energy per resource element (EPRE) from received DM-RS EPRE upon PDSCH demodulation. That is, assume that DM-RS EPRE and PDSCH EPRE are the same at rank 2 or less and DM-RS EPRE is boosted by 3 dB at rank 3 or more.

In particular, according to the current standard document, since orthogonality between DM-RS ports is ensured through FDM in transmission of rank 3 or more from the viewpoint of SU-MIMO, DM-RS port 9 is transmitted on REs different from those of DM-RS ports 7 and 8. As a result, DM-RS port 9 is not transmitted on 12 REs, on which DM-RS ports 7 and 8 are transmitted, and DM-RS ports 7 and 8 are not transmitted on 12 REs, on which DM-RS port 9 is transmitted.

Accordingly, from the viewpoint of DM-RS port 9 (that is, the layer corresponding to DM-RS port 9), DM-RSs of DM-RS port 9 are transmitted with higher power using power corresponding to 12 REs allocable to DM-RS ports 7 and 8, thereby increasing power efficiency. Similarly, from the viewpoint of DM-RSs of DM-RS ports 7 and 8 (that is, the layer corresponding to DM-RS ports 7 and 8), DM-RSs of DM-RS ports 7 and 8 are transmitted with higher power using power corresponding to 12 REs allocable to DM-RS port 9, thereby increasing power efficiency. This is referred to as DM-RS power boosting.

According to the current LTE standard, the UE knows that DM-RS power has been boosted (i.e., by 3 dB as compared to PDSCH power) at rank 3 and estimates PDSCH EPRE in consideration of boosting.

However, as described above, if DM-RS ports 7, 8, 11 and 13 are used in addition to DM-RS ports 7, 8, 9 and 10 at rank 3 and rank 4, power boosting is disabled using an existing method. For example, at rank 3, the eNB may inform the UE whether DM-RS ports 7, 8 and 9 or DM-RS ports 7, 8 and 11 are used. If DM-RS ports 7, 8 and 11 are used, since CDM is performed through length-4 OCC without using FDM, DM-RS RE overhead is 12 REs. Accordingly, in the case of rank 3, if the eNB uses DM-RS ports 7, 8 and 9, power boosting is enabled using the existing method and, if the eNB uses DM-RS ports 7, 8 and 11, power boosting is disabled using the existing method.

As another example, at rank 4, the eNB may inform the UE whether DM-RS ports 7, 8, 9 and 10 or DM-RS ports 7, 8, 11 and 13 are used. If DM-RS ports 7, 8, 11 and 13 are used, since CDM is performed through length-4 OCC without using FDM, DM-RS RE overhead is 12 REs. Accordingly, in the case of rank 4, if the eNB uses DM-RS ports 7, 8, 9 and 10, power boosting is enabled using the existing method and, if the eNB uses DM-RS ports 7, 8, 11 and 13, power boosting is disabled using the existing method.

In order to solve such a problem, assumption of PDSCH power using the following method a) or method b) is proposed. Hereinafter, a UE-specific reference signal is referred to as a DM-RS.

Method a)

For transmission mode for FD-MIMO, if UE-specific RSs (i.e., DM-RSs) are present in the PRBs upon which the corresponding PDSCH is mapped, the UE may assume the ratio of PDSCH EPRE to UE-specific RS EPRE within each OFDM symbol containing UE-specific RS:
  is 0 dB for number of transmission layers less than 3 and
  is −3 dB for number of transmission layers more than 4 and
  is −3 dB for number of transmission layers equal to 3 using DM-RS port 7, 8, 9 and is −3 dB for number of transmission layers equal to 4 using DM-RS port 7, 8, 9, 10 and is 0 dB for number of transmission layers equal to 3 using DM-RS port 7, 8, 11 and is 0 dB for number of transmission layers equal to 4 using DM-RS port 7, 8, 11, 13.

In method a), the transmission mode for FD-MIMO may be TM x newly defined for FD-MIMO or may mean that FD-MIMO transmission is configured by the eNB in an existing TM (e.g., TM 9 or TM 10). In addition, if specific RRC signaling indicating that a DM-RS configuration of a new length-4 OCC for FD-MIMO (different from Table 5) should be applied is received, the above-described operation may be defined/configured to be applied.

Method b)

Although, in method a), DM-RS power boosting is disabled if DM-RS ports 7, 8 and 11 or DM-RS ports 7, 8, 11 and 13 are used at rank 3 or rank 4, a method of using DM-RS boosting even in this case is further proposed in order to increase channel estimation accuracy.

If DM-RS ports 7, 8, 11 and 13 are used unlike rank 3 and rank 4 using DM-RS ports 7, 8, 9 and 10, since there is no RE on which power is not transmitted through a specific DM-RS port, power may be borrowed from a PDSCH located at the same OFDM symbols, on which the DM-RSs are transmitted, to be used for DM-RS power boosting.

That is, since PDSCHs are transmitted on nine subcarriers of 12 subcarriers present in OFDM symbols, on which DM-RSs are transmitted, in one PRB pair and DM-RSs are transmitted on three subcarriers, power of x is borrowed from each of the nine subcarriers and power of a total of 9x is equally divided into three subcarriers and used for power boosting.

For example, when it is assumed that PDSCH EPRE (transmitted on an OFDM symbol in which a CRS is not present) is 1 before applying DM-RS power boosting, each of nine subcarriers, on which the PDSCHs are transmitted, of 12 subcarriers present in the OFDM symbols, on which the DM-RSs are transmitted, in one PRB pair is transmitted with power of 1−x and each of three subcarriers, on which the DM-RSs are transmitted, is transmitted with power of 1+3x. Here, power of 3x is used for power boosting of the DM-RS REs. In addition, PDSCH EPRE is still transmitted with power of 1 on the OFDM symbol, on which the CRS is not transmitted, of the OFDM symbols, on which the DM-RSs are not transmitted.

Additionally, PDSCH EPRE may be calculated as follows in the OFDM symbol, on which the CRS is transmitted, of the OFDM symbols, on which the DM-RSs are transmitted.

PDSCH EPRE may be obtained by obtaining a ratio r of PDSCH EPRE of the OFDM symbol, on which the CRS is transmitted, to PDSCH EPRE of the OFDM symbol, on which the CRS is not transmitted, from a PB which is a parameter provided through RRC signaling and multiplying PDSCH EPRE (that is, 1) of the OFDM symbol, on which the CRS is not transmitted, of the OFDM symbols, on which the DM-RSs are not transmitted, by r In summary, for transmission mode for FD-MIMO, if UE-specific RSs are present in the PRBs upon which the corresponding PDSCH is mapped, the UE may assume the ratio of PDSCH EPRE to UE-specific RS EPRE within each OFDM symbol containing UE-specific RS:

is 0 dB for number of transmission layers less than 3 and is −3 dB for number of transmission layers more than 4 and is −3 dB for number of transmission layers equal to 3 using DM-RS port 7, 8, 9 and is −3 dB for number of transmission layers equal to 4 using DM-RS port 7, 8, 9, 10 and is x1 dB for number of transmission layers equal to 3 using DM-RS port 7, 8, 11 and is x2 dB for number of transmission layers equal to 4 using DM-RS port 7, 8, 11, 13.

Here, x1 and x2 are fixed values or may be determined by the eNB and signaled to the UE.

Detailed examples of method b) will now be described.

First, power related parameters A, B and C may be defined as follows.

A: PDSCH EPRE in the OFDM symbol in which the DM-RS is present

B: PDSCH EPRE in the OFDM symbol in which the DM-RS is not present and the CRS is not present C: PDSCH EPRE in the OFDM symbol in which the DM-RS is not present and the CRS is present In this case, DM-RS EPRE is scaled up or down by x1 dB to obtain A. If $k=10^{0.1*x1}$ is defined, since $k=(1-x)/(1+3x)$ and $x=(1-k)/(1+3k)$, $B=A+x$. In addition, when the value indicated by $P_B$ is defined as C/B, $P_B$ may be applied to the value B to obtain C.

Alternatively, after, a ratio of A to B, that is, A/B, is defined, the eNB may inform the UE of this value or A/B may be set to a fixed value in advance. Accordingly, after A is first obtained, B may be obtained using A/B and, when the value indicated by $P_B$ is defined as C/B, $P_B$ may be applied to the value B to obtain C.

Figure 10:
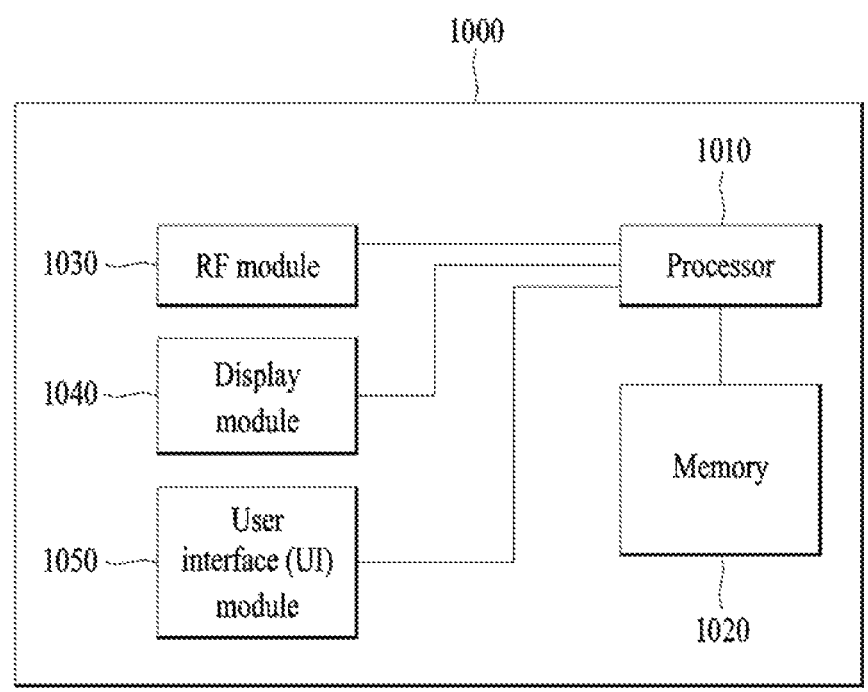
FIG. 10 is a block diagram of a communication apparatus according to an embodiment of the present invention.

FIG. 10 is a block diagram of a communication apparatus according to an embodiment of the present invention.

Referring to FIG. 10, a communication apparatus 1000 includes a processor 1010, a memory 1020, an RF module 1030, a display module 1040, and a User Interface (UI) module 1050.

The communication device 1000 is shown as having the configuration illustrated in FIG. 10, for the convenience of description. Some modules may be added to or omitted from the communication apparatus 1000. In addition, a module of the communication apparatus 1000 may be divided into more modules. The processor 1010 is configured to perform operations according to the embodiments of the present invention described before with reference to the drawings. Specifically, for detailed operations of the processor 1010, the descriptions of FIGS. 1 to 9 may be referred to.

The memory 1020 is connected to the processor 1010 and stores an Operating System (OS), applications, program codes, data, etc. The RF module 1030, which is connected to the processor 1010, upconverts a baseband signal to an RF signal or downconverts an RF signal to a baseband signal. For this purpose, the RF module 1030 performs digital-to-analog conversion, amplification, filtering, and frequency upconversion or performs these processes reversely. The display module 1040 is connected to the processor 1010 and displays various types of information. The display module 1040 may be configured as, not limited to, a known component such as a Liquid Crystal Display (LCD), a Light Emitting Diode (LED) display, and an Organic Light Emitting Diode (OLED) display. The UI module 1050 is connected to the processor 1010 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

According to an embodiment of the present invention, it is possible to efficiently report feedback information for division beamforming in a wireless communication system.

It will be appreciated by persons skilled in the art that that the effects that can be achieved through the present invention are not limited to what has been particularly described hereinabove and other advantages of the present invention will be more clearly understood from the following detailed description.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method of reporting channel quality information (CQI) by a user equipment (UE) to a base station (BS) in a wireless communication system, the method comprising:
receiving a cell specific reference signal from the BS;
calculating the CQI using the cell specific reference signal on the assumption that a specific number of resource elements (REs) for a demodulation-reference signal (DM-RS) exists; and
reporting the CQI to the BS,
wherein, if a most recent reported rank is less than 3, the specific number of REs for the DM-RS is assumed as a minimum number of REs for the DM-RS,
wherein, if the most recent reported rank is more than 4, the specific number of REs for the DM-RS is assumed as a maximum number of REs for the DM-RS,
wherein, if the most recent reported rank is 3 or 4, the specific number of REs for the DM-RS is assumed as a specific value, and
wherein, when a rank is 3 or 4, antenna orts of the DM-RS are mapped to same resource elements by a code divisional multiplexing (CDM) scheme or to different resource elements by the CDM scheme and a frequency divisional multiplexing (FDM) scheme.

2. The method of claim 1, further comprising:
receiving information on the specific value from the BS.

3. The method of claim 1, wherein the specific value is transmitted with the CQI to the BS.

4. The method of claim 1, wherein the specific value is equal to half a sum of the minimum number and the maximum.number.

5. The method of claim 1, wherein:
when the antenna ports of the DM-RS are mapped to the same resource elements and the rank is 3, indexes of the antenna ports of the DM-RS are 7, 8 and 11, and
when the antenna ports of the DM-RS are mapped to the different resource elements and the rank is 3, indexes of the antenna ports of the DM-RS are 7, 8 and 9.

6. The method of claim 1, wherein:
when the antenna ports of the DM-RS are mapped to the same resource elements and the rank is 4, indexes of the antenna ports of the DM-RS are 7, 8, 11 and 13, and
when the antenna ports of the DM-RS are mapped to the different resource elements and the rank is 4, indexes of the antenna ports of the DM-RS are 7, 8, 9 and 10.

7. The method of claim 1, further comprising:
receiving a downlink data channel from the BS,
wherein, if a rank of the downlink data channel is less than 3, it is assumed that a transmission power of the DM-RS is same as a transmission power of the downlink data channel,
wherein, if the rank of the downlink data channel is more than 4, it is assumed that the transmission power of the DM-RS is greater than the transmission power of the downlink data channel by 3 dB, and
wherein, if the rank of the downlink data channel is 3 or 4, it is assumed that the transmission power of the DM-RS is greater than the transmission power of the downlink data channel by a first value or a second value, respectively.

8. The method of claim 7, further comprising:
receiving information on the first and second values from the BS.

9. A user equipment (UE) in a wireless communication system, the UE comprising:
a transceiver; and
a processor configured to:
control the transceiver to receive a cell specific reference signal from a base station (BS),
calculate channel quality information (CQI) using the cell specific reference signal on the assumption that a specific number of resource elements (REs) for a demodulation-reference signal (DM-RS) exists, and
report the CQI to the BS, wherein, if a most recent reported rank is less than 3, the processor assumes that the specific number of REs for the DM-RS is a minimum number of REs for the DM-RS, wherein, if the most recent reported rank is more than 4, the processor assumes that the specific number of REs for the DM-RS is a maximum number of REs for the DM-RS, wherein, if the most recent reported rank is 3 or 4, the processor assumes that the specific number of REs for the DM-RS is a specific value, and wherein, when a rank is 3 or 4, antenna ports of the DM-RS are mapped to same resource elements by a code divisional multiplexing (CDM) scheme or to different resource elements by the CDM scheme and a frequency divisional multiplexing (FDM) scheme.

10. The UE of claim 9, wherein information on the specific value is received from the BS.

11. The UE of claim 9, wherein the specific value is transmitted with the CQI to the BS.

12. The UE of claim 9, wherein the specific value is equal to half a sum of the minimum number and the maximum-.number.

13. The UE of claim 9, wherein:
when the antenna ports of the DM-RS are mapped to the same resource elements and the rank is 3, indexes of the antenna ports of the DM-RS are 7, 8 and 11, and
when the antenna ports of the DM-RS are mapped to the different resource elements and the rank is 3, indexes of the antenna ports of the DM-RS are 7, 8 and 9.

14. The UE of claim 9, wherein:
when the antenna ports of the DM-RS are mapped to the same resource elements and the rank is 4, indexes of the antenna ports of the DM-RS are 7, 8, 11 and 13, and
when the antenna ports of the DM-RS are mapped to the different resource elements and the rank is 4, indexes of the antenna ports of the DM-RS are 7, 8, 9 and 10.

15. The UE of claim 9, wherein the processor is further configured to receive a downlink data channel from the BS,
wherein, if a rank of the downlink data channel is less than 3, it is assumed that a transmission power of the DM-RS is same as a transmission power of the downlink data channel,
wherein, if the rank of the downlink data channel is more than 4, it is assumed that the transmission power of the DM-RS is greater than the transmission power of the downlink data channel by 3 dB, and
wherein, if the rank of the downlink data channel is 3 or 4, it is assumed that the transmission power of the DM-RS is greater than the transmission power of the downlink data channel by a first value or a second value, respectively.

16. The UE of claim 15, wherein information on the first and second values is received from the BS.

* * * * *